United States Patent
Fujioka et al.

(10) Patent No.: US 6,891,873 B2
(45) Date of Patent: May 10, 2005

(54) CYLINDRICAL STRAIGHT SLAB TYPE GAS LASER

(75) Inventors: Tomoo Fujioka, 15-18, Nishikata 2-chome, Bunkyou-ku, Tokyo (JP); Shigeru Yamaguchi, Hiratsuka (JP)

(73) Assignee: Tomoo Fujioka, Tokyo (JP)

( * ) Notice: Subject to any disclaimer, the term of this patent is extended or adjusted under 35 U.S.C. 154(b) by 96 days.

(21) Appl. No.: 09/854,421

(22) Filed: May 11, 2001

(65) Prior Publication Data

US 2002/0003829 A1 Jan. 10, 2002

(30) Foreign Application Priority Data

| May 19, 2000 | (JP) | ............... 2000-148656 |
| May 7, 2001 | (JP) | ............... 2001-136746 |

(51) Int. Cl.$^7$ ................................. H01S 3/22
(52) U.S. Cl. ........................... 372/55; 372/61
(58) Field of Search .................. 372/55–68, 37, 372/83, 94, 95, 99; 331/94.5

(56) References Cited

U.S. PATENT DOCUMENTS

| 3,969,687 A | * | 7/1976 | Freiberg et al. ............... 372/95 |
| 4,050,036 A | * | 9/1977 | Chambers et al. ............. 372/95 |
| 4,087,763 A | | 5/1978 | George et al. ............. 331/94.5 |
| 4,164,366 A | * | 8/1979 | Sziklas et al. ................ 372/95 |
| 4,514,850 A | * | 4/1985 | Holmes et al. ............... 372/95 |
| 4,516,244 A | | 5/1985 | Holmes ........................ 372/99 |
| 4,520,486 A | * | 5/1985 | Lavarini ...................... 372/95 |
| 4,606,036 A | * | 8/1986 | Holmes ........................ 372/95 |
| 4,719,639 A | | 1/1988 | Tulip ........................... 372/66 |
| 4,744,090 A | | 5/1988 | Freiberg ....................... 372/94 |
| 4,991,182 A | | 2/1991 | Logan et al. .................. 372/94 |
| 5,099,492 A | * | 3/1992 | Zajdman et al. ............... 372/99 |
| 5,128,953 A | | 7/1992 | Macken ........................ 372/58 |
| 5,373,525 A | * | 12/1994 | Nowack et al. ................ 372/64 |
| 5,528,613 A | | 6/1996 | Macken et al. ................ 372/37 |
| 5,640,411 A | * | 6/1997 | Bochum et al. ............... 372/64 |
| 5,661,746 A | | 8/1997 | Sukhman et al. .............. 372/83 |
| 5,748,663 A | | 5/1998 | Chenausky .................... 372/64 |
| 6,442,187 B1 | * | 8/2002 | Dutov et al. ................. 372/101 |

FOREIGN PATENT DOCUMENTS

| DE | 4424726 | | 7/1994 | | |
| JP | 63-48884 | | 3/1988 | | |
| JP | 3-62579 | | 3/1991 | | |
| JP | 3-71683 | | 3/1991 | | |
| JP | 03-062579 | * | 3/1991 | ........... H01S/3/081 |
| JP | 58-22759 | | 8/1991 | | |
| JP | 11-317558 | | 11/1999 | | |
| JP | 2000-148656 | * | 5/2000 | ............. H01S/3/22 |

* cited by examiner

*Primary Examiner*—Minsun Oh Harvey
*Assistant Examiner*—Tuan N. Nguyen
(74) *Attorney, Agent, or Firm*—Dellett & Walters

(57) ABSTRACT

The present invention provides a cylindrical slab type gas laser for generating an excellent laser beam having substantially Gaussian intensity distribution of the focussed output laser beam. For this end, a pair of cylindrical electrodes 11, 12 of different diameter are disposed vertically and concentrically. And laser medium is filled in the gap between the two cylindrical electrodes 11, 12 to define a cylindrical straight slab 1. Disposed at one end of the cylindrical top of the cylindrical straight slab 1 is a ring-shaped trick mirror M1 and also disposed at the center of the one end of the cylindrical straight slab 1 is an output mirror M2 to pass a part of the light and to reflect a part of the remaining light. On the other hand, disposed at the other end of the cylindrical straight slab 1 is a w-axicon mirror M3. The above construction eliminates the need for spacers between the two cylindrical electrodes 11, 12 which are required in a conventional gas laser.

11 Claims, 6 Drawing Sheets

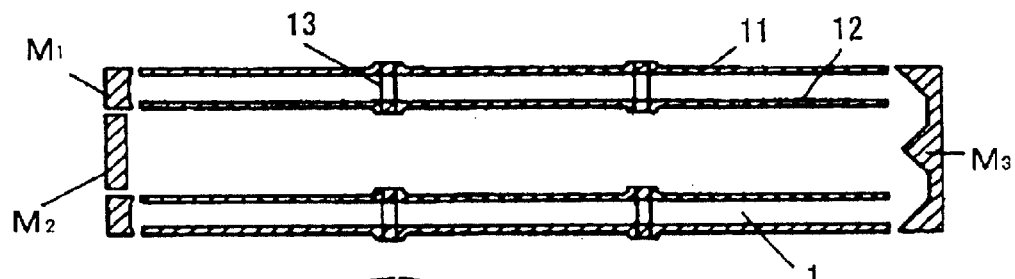
FIG. 1(a) PRIOR ART
FIG. 1(b) PRIOR ART
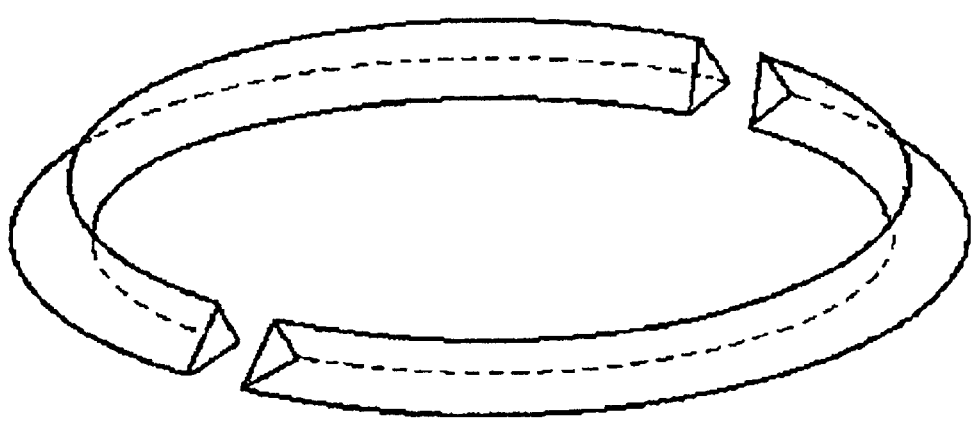
FIG. 2

CYLINDRICAL STRAIGHT SLAB TYPE GAS LASER

BACKGROUND OF THE INVENTION

The present invention relates to a slab type gas laser, more specifically to a construction to provide an excellent laser beam having substantially Gaussian distribution in focussed output laser beam profile.

A slab type gas laser is known as one type of gas lasers such as CO2 (carbon dioxide) laser. In a slab type gas laser, the gap between excitation electrodes is narrow so that the excited gas colliding with the electrodes is cooled, thereby accelerating the release of laser lower level. This is the reason why the laser is known as an electrode diffusion cooling type laser.

The slab type gas laser is classified into a waveguide type laser and a straight type laser depending on the way how the light propagates. In the waveguide type laser including a CO2 laser of 10 μm emission wavelength, the gap between two electrodes is in the order of approximately several mm. The laser beam propagates in the waveguide mode by being reflected between the electrodes in a zigzag manner. On the other hand, in the straight type gas laser, the gap between the electrodes is large enough so that the light can propagate in the free space. As a result, the light propagates between the electrodes in a free space mode.

A known cylindrical straight slab type gas laser comprises a pair of cylindrical electrodes of different diameter disposed horizontally and concentrically. The gap between the two cylindrical electrodes is filled with laser medium to define a cylindrical straight slab. A ring-shaped mirror is disposed at one end of the cylindrical straight slab and an output mirror is disposed at the center of the one end to pass a part of the light through the output mirror while reflecting a part of the remaining light by the output mirror. A w-axicon mirror is disposed at the other end of the cylindrical straight slab.

SUMMARY OF THE INVENTION

In a conventional cylindrical straight slab type gas laser employing such cylindrical straight slab does not exhibit preferable Gaussian distribution profile in beam intensity without operating the two cylindrical electrodes in accurate concentric relationship. As a result, a plurality of spacers are required to maintain accurate concentric relationship between the two cylindrical electrodes.

Unfortunately, however, the use of the spacers causes non-uniform beam profile which is impractical for a cutting machine because cutting width and cutting efficiency vary depending on the direction of movement of the beam.

It is, therefore, an object of the present invention to overcome the above problems of the prior art and to provide a slab type gas laser employing a cylindrical straight slab that eliminates the need for spacers for properly positioning the two cylindrical electrodes.

BRIEF DESCRIPTION OF DRAWINGS

Now, the present invention will be described in greater detail by reference to the accompanying drawings, wherein:

FIG. 1 is a cross section view (A) and a side view (B) of one example of a conventional cylindrical straight slab type gas laser:

FIG. 2 shows a laser beam intensity distribution at the exit of an output mirror of a conventional laser:

DESCRIPTION OF THE PREFERRED EMBODIMENTS

For better understanding of the embodiments of the present invention, a conventional cylindrical straight slab type gas laser will be described first by reference to FIGS. 1–3. FIG. 1(A) is a cross-section view and FIG. 1(B) is a side view of a conventional cylindrical straight slab type gas laser. As illustrated in FIG. 1, the cylindrical straight slab type gas laser comprises a pair of concentrically and horizontally disposed cylindrical electrodes 11, 12 of different diameter. The gap between the two cylindrical electrodes 11, 12 is filled with laser medium to define a cylindrical straight slab 1. A ring-shaped trick mirror M1 is disposed at one end of the cylindrical straight slab 1. Also disposed at the center of the one end of the cylindrical straight slab 1 is an output mirror (half mirror) M2 to pass a part of the light through the output mirror while reflecting a part of the remaining light by the output mirror. A w-axicon mirror M3 is disposed at the other end of the cylindrical straight slab 1.

Figure 3A:
FIG. 3 shows an intensity distribution of a far-field image of the laser beam as shown in FIG. 2 focused by a lens.
Figure 3B:

As mentioned above, the cylindrical straight slab type gas laser employing the cylindrical straight slab 1 may exhibit non-uniform split beam intensity distributions as shown in FIGS. 3(A) and (B) unless operated with accurate concentric positioning of the two cylindrical electrodes 11, 12. This is the reason why a plurality of spacers 13 are provided between the two cylindrical electrodes 11, 12 as illustrated in side view in FIG. 1. However, such spacers 13 cause beam intensity distribution with split peaks as shown in FIG. 2 at the exit of the output mirror M2.

When the laser beam is used in a cutting machine, any laser beam departing from the Gaussian distribution is impractical because cutting width and efficiency vary depending on the direction of movement of the laser beam. This means that the spacers for maintaining the concentric relationship between the two cylindrical electrodes 11, 12 are obstacle to excellent laser beam profile.

The cylindrical straight slab type gas laser according to the present invention comprises two concentrically upstanding cylindrical electrodes of different diameter. The gap between the two cylindrical electrodes is filled with laser medium to define a cylindrical straight slab. A ring-shaped mirror is disposed at one end of the cylindrical straight slab. An output mirror is disposed at the center of the one end of the cylindrical straight slab to pass a part of the light through the output mirror while reflecting a part of the remaining light by the output mirror. A w-axicon mirror is disposed at the other end of the cylindrical straight slab to eliminate spacers between the two cylindrical electrodes.

(First Embodiment)

Figure 4:
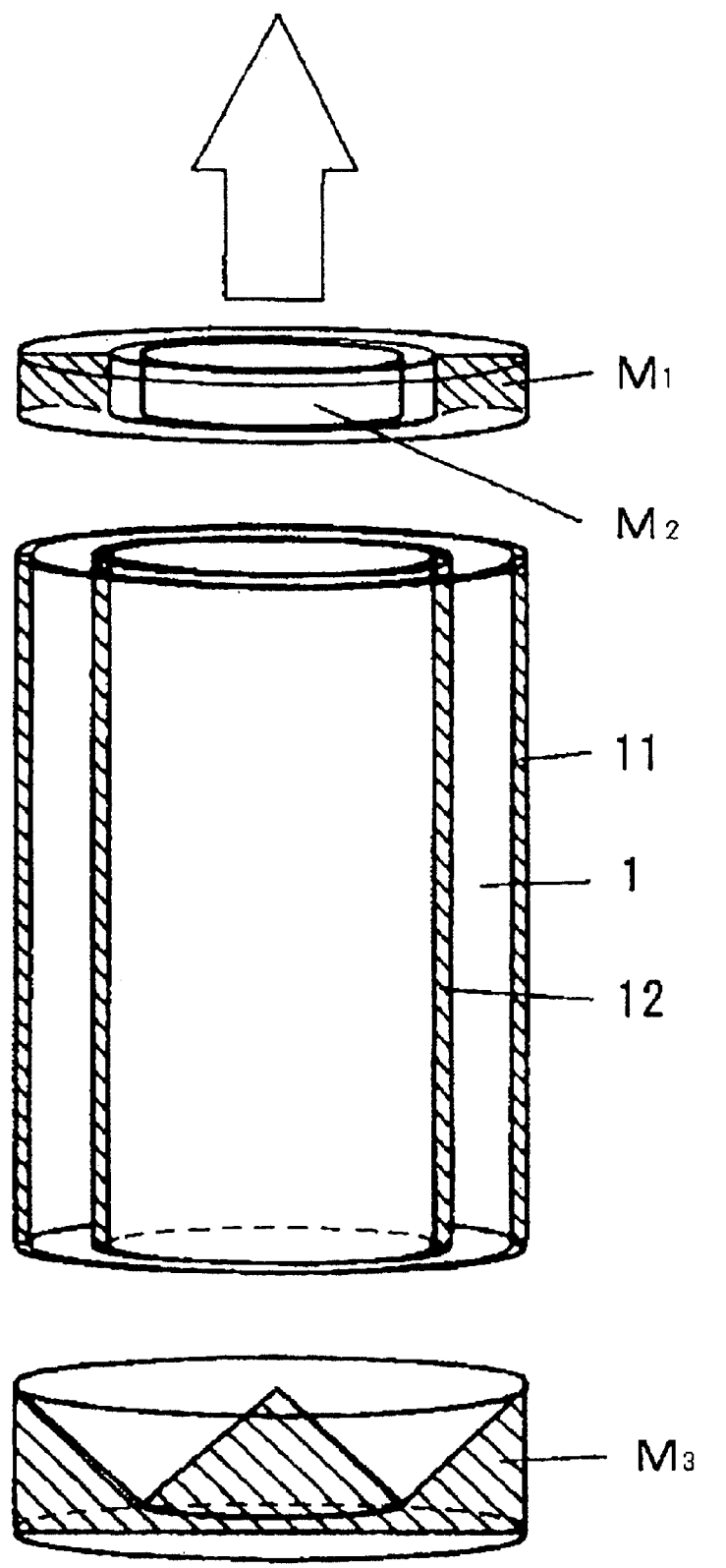
FIG. 4 is a simplified view of a first embodiment of the cylindrical straight slab type gas laser according to the present invention

Now, illustrated in FIG. 4 is a simplified construction of the gas laser according to the present invention. The gas laser comprises a cylindrical straight slab 1 including a pair of vertically and concentrically disposed cylindrical electrodes 11, 12 of different diameter and laser medium filled in the gap between the two cylindrical electrodes 11, 12 to define a cylindrical straight slab 1. A ring-shaped trick mirror M1 is disposed at the top of the cylindrical straight slab 1 and also disposed at the top center of the cylindrical straight slab 1 is an output mirror (or half mirror) M2 to pass a part of the light through the output mirror and reflecting a part of the remaining light by the output mirror. Additionally, a w-axicon mirror M3 is disposed at the bottom of the cylindrical straight slab 1. This particular construction is effective to eliminate the need for spacers between the two cylindrical electrodes 11,12.

The outer cylindrical electrode 11, the ring-shaped trick mirror M1 and the w-axicon mirror M3 may be held in position by being supported to a frame of the device. On the other hand, the inner cylindrical electrode 12 extends at the upper end thereof to the inner circumferential surface of the ring-shaped trick mirror M1 thereby holding the upper end of the inner cylindrical electrode 12 on the inner surface of the trick mirror M1. The output mirror M2 may be held to the upper end of the inner cylindrical electrode 12.

When high frequency excitation voltage is applied between the cylindrical electrodes 11,12, the gas filled in the cylindrical straight slab 1 is excited to generate the laser beam by a resonator including the three mirrors M1, M2 and M3 and the laser beam is extracted from the output mirror M2.

Figure 5:
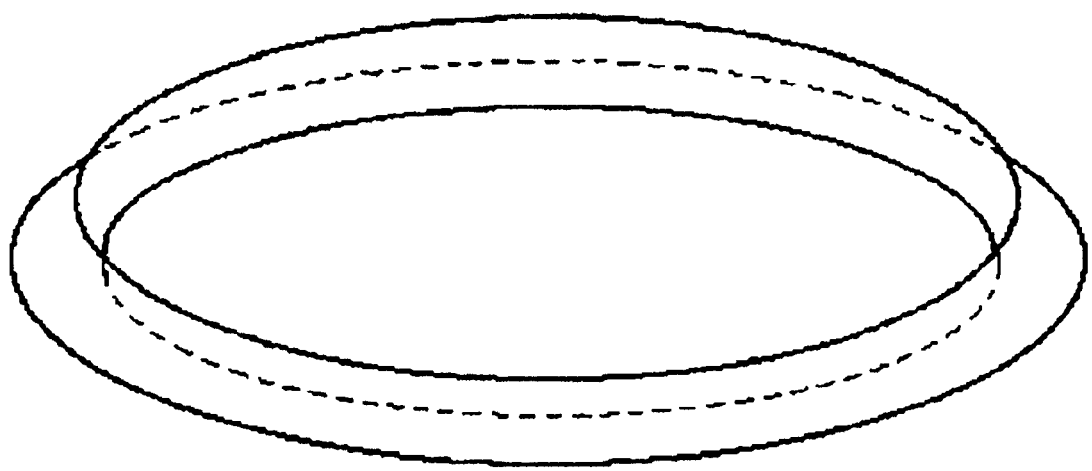
FIG. 5 is a laser beam intensity distribution at the exit of an output mirror of the laser as shown in FIG. 4.
Figure 6A:
FIG. 6 shows laser beam intensity distributions of the far-field image of the laser beam as shown in FIG. 5 focussed by a lens.
Figure 6B:
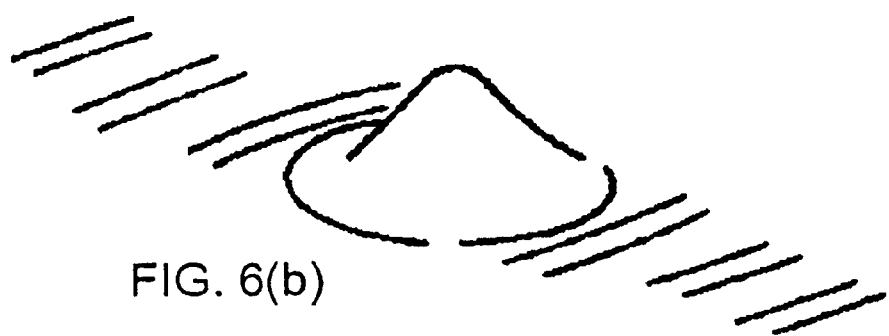

The intensity distribution at the exit of the output mirror M2 is in the mode with aligned peak as shown in FIG. 5. The far-field image of the laser beam in this mode focused by a lens is a uniform beam close to Gaussian intensity distribution as shown in FIG. 6(A) and (B)

(Second Embodiment)

Figure 7:
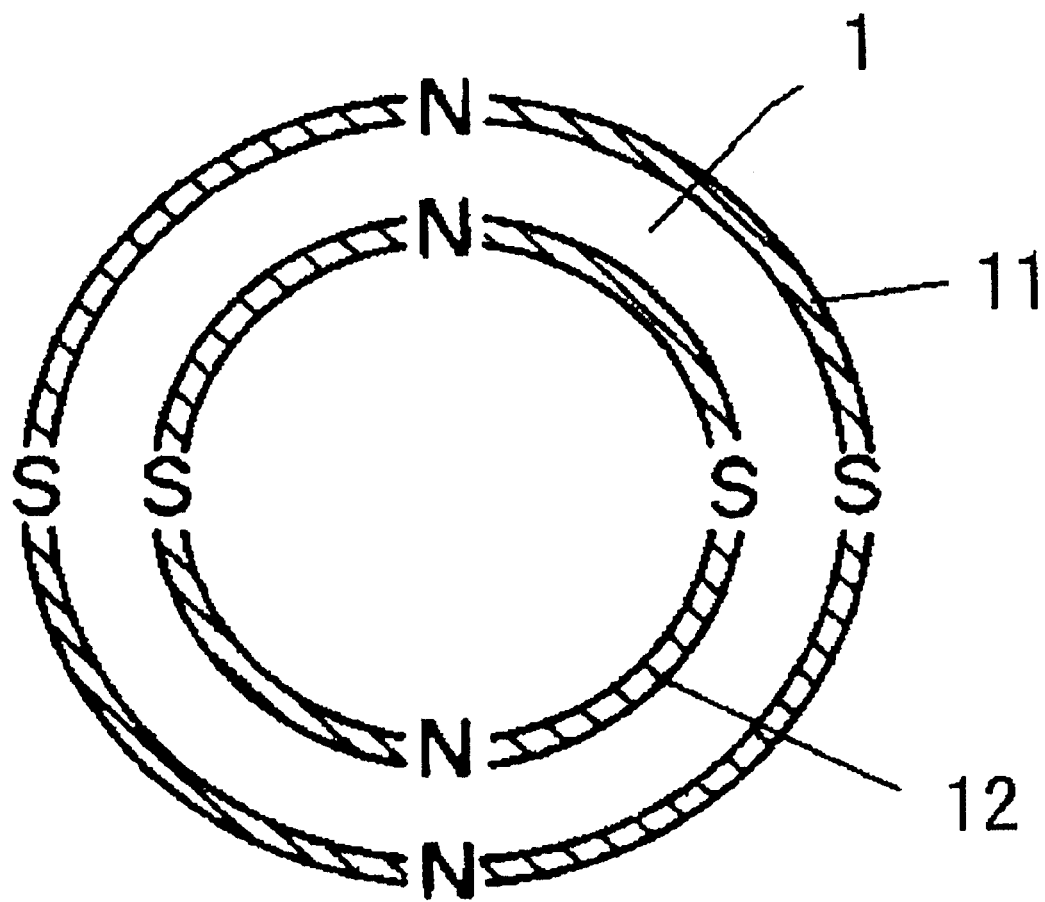
FIG. 7 is a cross section view of an important part of a second embodiment of the gas laser according to the present invention.

Positioning means for maintaining a pair of vertically disposed cylindrical electrodes 11, 12 in a concentric relationship is accomplished by making the cylindrical electrodes 11, 12 from ferro magnetic material and by magnetizing the material to have two or more permanent magnetic poles as illustrated in FIG. 7. The cylindrical permanent magnets are disposed in such a manner that inner and outer cylindrical magnets repel to one another, thereby stably holding the two cylindrical electrodes 11, 12 in concentric manner.

As understood from the above description of the preferred embodiments, the gas laser according to the present invention can provide substantially uniform output beam close to Gaussian intensity distribution, which is suitable for a cutting machine. Since the concentric type straight slab laser is a diffused cooling type, there is no need for a circulation pump, thereby avoiding vibration and making the gas laser less expensive to make.

Although preferred embodiments of the cylindrical straight slab type gas laser according to the present invention are described herein, it is to be understood that the invention is not limited only to the above embodiments and that various modifications can be made by a person having an ordinary skill in the art without departing from the scope and spirit of the present invention. For example, the relationship between the cylindrical straight slab 1 and the mirrors M1~M3 may be inverted without changing the performance. In other words, the w-axicon mirror M3 is disposed at the top of the cylindrical straight slab 1 while the ring-shaped trick mirror M1 and the output mirror (half mirror) M2 is disposed at the bottom of the cylindrical straight slab 1.

What is claimed is:

1. A cylindrical straight slab type gas laser comprising:
   a pair of cylindrical electrodes of different diameter disposed vertically and concentrically defining a gap between the cylindrical electrodes filled with laser medium to define a cylindrical straight slab;
   a ring-shaped trick mirror disposed at one end of the cylindrical straight slab;
   an output mirror disposed at the center of the one end of the cylindrical straight slab to receive light generated by said electrodes, wherein said output mirror is configured to pass a part of the light and to reflect a part of the remaining light; and
   a w-axicon mirror disposed at the other end of the cylindrical straight slab, the straight slab being configured to operably maintain the gap between the electrodes without the need for spacers disposed between the electrodes.

2. A cylindrical straight slab type gas laser of claim 1, wherein the two cylindrical electrodes are made from ferromagnetic material that is magnetized to form two or more cylindrical permanent magnetic poles, and the two cylindrical electrodes are so that the inner and outer cylindrical permanent magnets repel to one another.

3. A cylindrical straight slab type gas laser of claim 1, wherein the output laser beam from the output mirror has substantially Gaussian intensity distribution when it is focussed by a lens.

4. A cylindrical straight slab type gas laser of claim 1, wherein the output laser beam is applied to cutting machines.

5. A cylindrical straight slab type gas laser of claim 2, wherein the output laser beam from the output mirror has substantially Gaussian intensity distribution when it is focussed by a lens.

6. A cylindrical straight slab type gas laser of claim 5, wherein the output laser beam is applied to cutting machines.

7. A cylindrical straight slab type gas laser of claim 2, wherein the output laser beam is applied to cutting machines.

8. A cylindrical straight slab type gas laser of claim 3, wherein the output laser beam is applied to cutting machines.

9. A cylindrical straight slab type gas laser comprising:
   a pair of cylindrical electrodes of different diameter disposed vertically and concentrically defining a gap between the cylindrical electrodes filled with laser medium to define a cylindrical straight slab;
   a ring-shaped trick mirror disposed at one end of the cylindrical straight slab;
   an output mirror disposed at the center of the one end of the cylindrical straight slab to receive light generated by said electrodes, wherein said output mirror is configured to pass a part of the light and to reflect a part of the remaining light; and
   a w-axicon mirror disposed at the other end of the cylindrical straight slab, the straight slab being configured to provide a sufficiently constant gap between the electrodes without the need for a spacer disposed between the electrodes and between the w-axicon and output mirrors.

10. The cylindrical straight slab type gas laser of claim 9, wherein the cylindrical shaped electrodes are supported at their ends to maintain the gap by the trick, output, and w-axicon mirrors.

11. A cylindrical straight type gas laser of claim 1, wherein the inner cylindrical electrode of the pair of cylindrical electrodes extends at an upper end thereof into the inner circumferential surface of the ring-shaped trick mirror.

* * * * *